(No Model.) 2 Sheets—Sheet 1.
J. O. BROWN.
DRIVE CHAIN.
No. 499,961. Patented June 20, 1893.
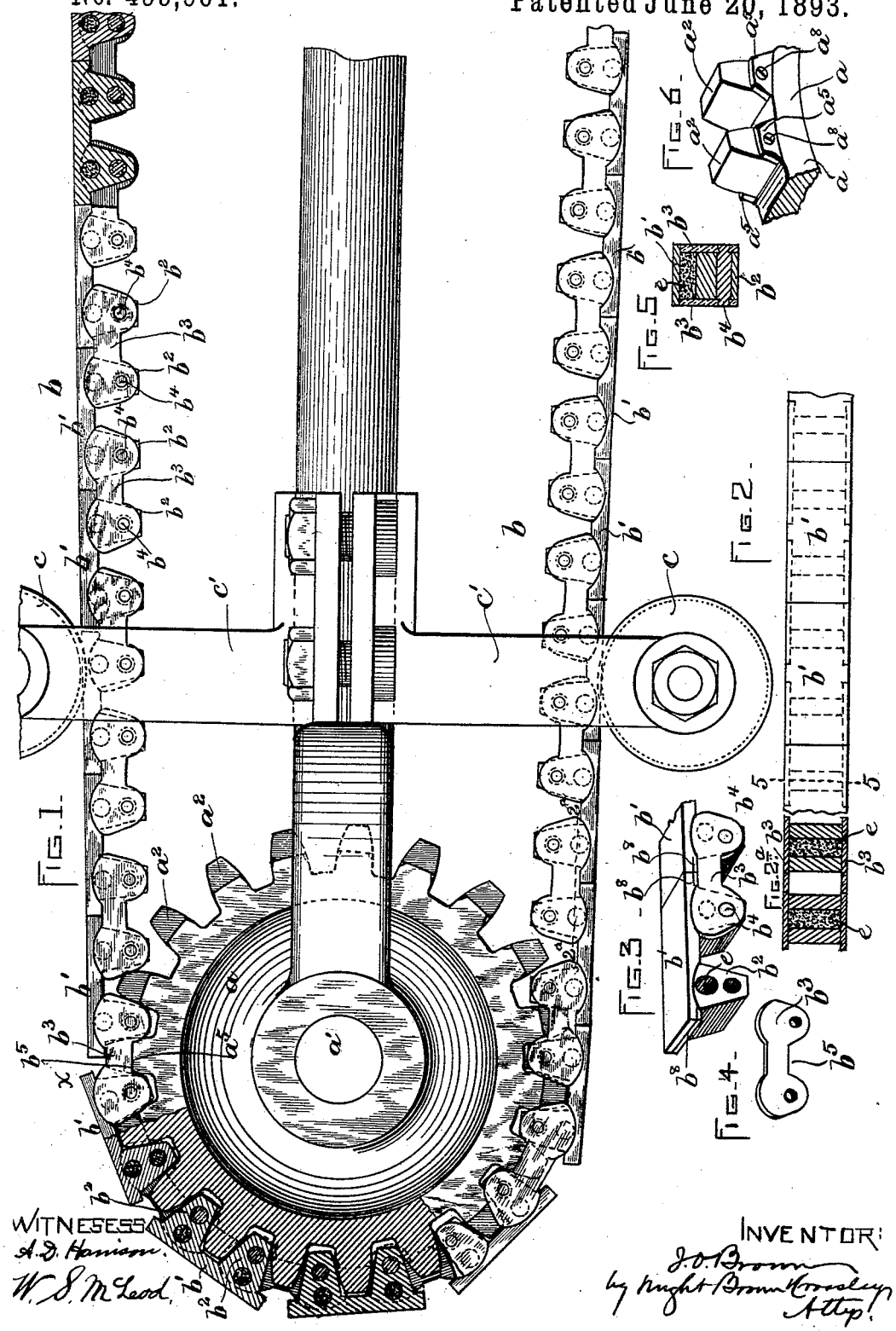
WITNESSES
A. D. Harrison.
W. S. McLeod.
INVENTOR:
J. O. Brown
by Knight Brown Crossley
Atty.

(No Model.) 2 Sheets—Sheet 2.
J. O. BROWN.
DRIVE CHAIN.
No. 499,961. Patented June 20, 1893.
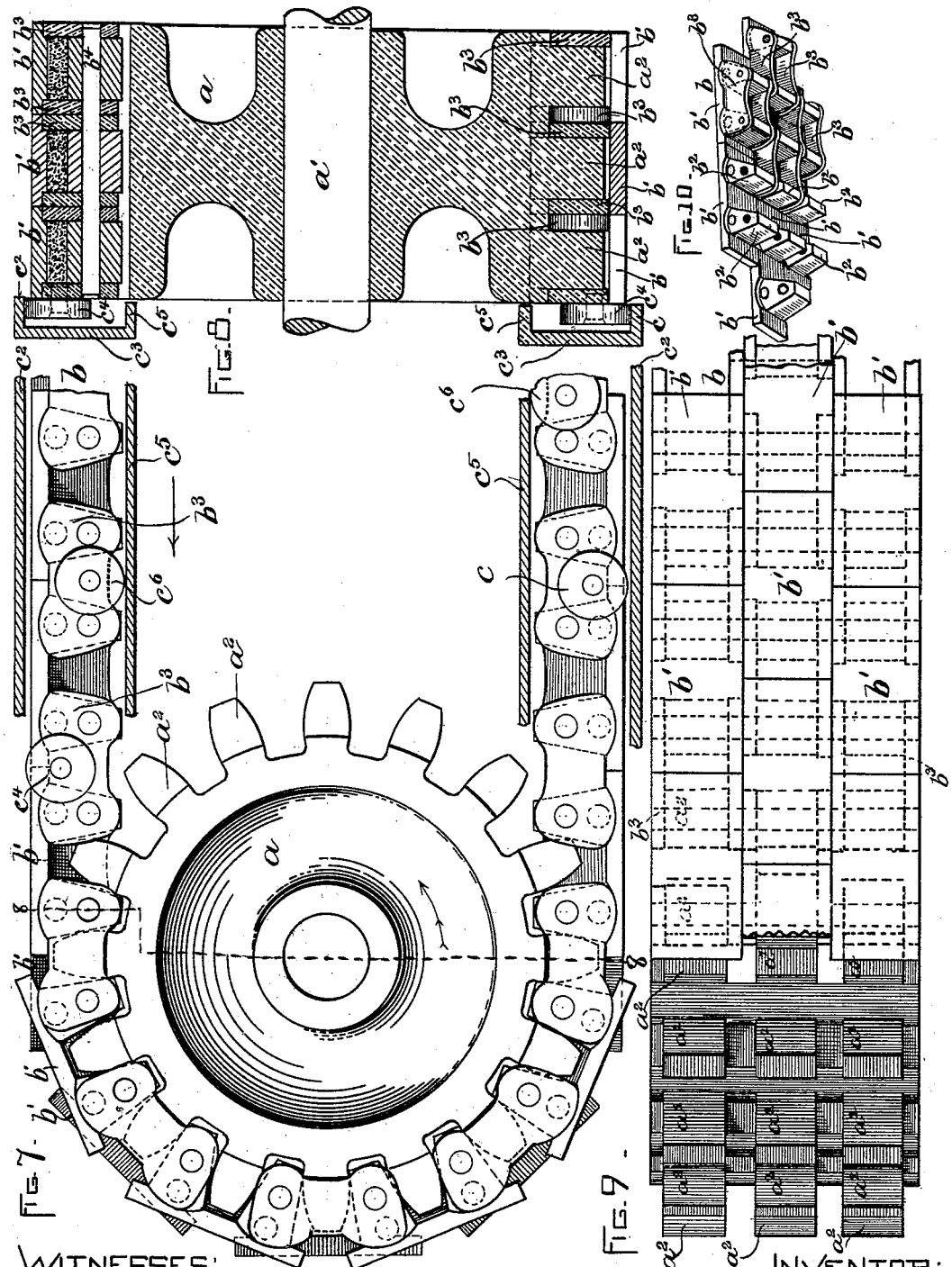

UNITED STATES PATENT OFFICE.

JAMES O. BROWN, OF BOSTON, MASSACHUSETTS, ASSIGNOR TO THE NATIONAL CHAIN GEAR COMPANY, OF PORTLAND, MAINE.

DRIVE-CHAIN.

SPECIFICATION forming part of Letters Patent No. 499,961, dated June 20, 1893.

Application filed December 5, 1892. Serial No. 454,129. (No model.)

*To all whom it may concern:*

Be it known that I, JAMES O. BROWN, of Boston, in the county of Suffolk and State of Massachusetts, have invented certain new and useful Improvements in Power-Transmitting Apparatus, of which the following is a specification.

This invention has for its object to enable a chain to communicate motion from one shaft to another with greater economy of power and to better advantage than heretofore, and it consists, first, in a power-transmitting device, comprising a chain, composed of links, which are provided on their inner sides with gear teeth, and are arranged end to end in such manner that inward flexure of the chain is prevented, and only such flexure is permitted as will permit the chain to pass freely around the gear wheels with which its teeth are engaged, so that the straight portions of the chain extending between the gear wheels constitute practically rigid racks, through one of which the driving-wheel imparts power to the driven wheel by pushing.

The invention also consists in the combination with a chain such as that above indicated, of a support or supports arranged to prevent the outward flexure of the chain between the pulleys, thus maintaining the chain in condition to transmit power by pushing.

The invention also consists in a chain composed of two or more rows of links, the links of each row breaking joints with those of the next, so that the teeth of the chain exert a continuous gripping action on the teeth of the gear wheel as hereinafter explained, for the purpose of preventing accidental separation of the chain from the gear wheel.

The invention also consists in certain other improvements, such as the provision of pockets for lubricating material in the ends of the chain teeth, and the form and arrangement of the toothed links of the chain and of the connecting-plates which secure said links together, all of which I will now proceed to describe and claim.

Of the accompanying drawings, forming part of this specification: Figure 1 represents a side view of a gear wheel, and a portion of the chain that connects said wheel with another gear wheel, portions of the chain and a part of the wheel being shown in section. Fig. 2 represents a top view of a part of the chain. Fig. $2^a$ represents a section on line $2^a$—$2^a$, Fig. 1. Fig. 3 represents a perspective view of a portion of a chain. Fig. 4 represents a perspective view of one of the link-connecting plates. Fig. 5 represents a section on line 5—5, Fig. 2. Fig. 6 represents a perspective view of a portion of one of the gear wheels. Fig. 7 represents a side view of a gear wheel and a part of the chain, the latter being composed of a plurality of rows of links. Fig. 8 represents a section on line 8—8, Fig. 7. Fig. 9 represents a top view of the construction shown in Figs. 7 and 8, a portion of the chain being removed to expose the gear. Fig. 10 represents a perspective view of a portion of the chain shown in Figs. 7, 8 and 9.

The same letters of reference indicate the same parts in all the figures.

Referring first to Figs. 1 to 6 inclusive of the drawings, $a$ represents a gear wheel, affixed to a shaft $a'$, and having suitably-formed gear teeth $a^2$. The shaft $a'$ may be journaled in a suitable supporting-frame $a^3$, and power may be applied to it in any suitable way.

$b$ represents the chain, which is composed of links $b'$, each having (preferably) two gear teeth $b^2$, formed to engage the teeth $a^2$ of the wheel. The links are connected in an endless row or series by plates or sub-links $b^3$, each of which is pivoted at $b^4$ $b^4$ to the ends of the teeth of two links $b'$, the pivots $b^4$ being therefore located at one side of the plane of the links. The arrangement of the links is such that, when the chain is straight, the ends of each link abut against the ends of the adjacent links and against the plates $b^3$ in such manner as to prevent flexure of the chain inwardly or toward the space surrounded by the chain, the pivots $b^4$ being located inside the links or within said space, so that the end of each link constitutes a stop which prevents the end of the next link from swinging inwardly on its pivot. The straight portions of the chains are therefore practically rigid between the driving and the driven wheels, so that one side of the chain acts as a rack, through which the driving-wheel exerts a pushing force on the driven wheel, the other portion of the chain receiving a pushing force from the driven wheel.

The described form and arrangement of the links, their pivots and the connecting-plates, permit free outward flexure of the chain, so that it can readily conform to the periphery of the wheel $a$, in passing over the same, as shown in Fig. 1.

To prevent outward flexure of the straight portions of the chain between the wheels, I provide stops or guides, arranged to bear upon the outer sides of the chain, and prevent the links from swinging outwardly. Said stops or guides are shown in Fig. 1 as composed of loose rollers $c\ c$, journaled in bearings in arms $c'\ c'$, attached to the supporting-frame, the rollers being arranged to bear upon the outer sides of the straight portions of the chain, and thus prevent any outward flexure of said portions between the driving and driven wheels. It will be seen, therefore, that, since inward flexure of the straight portions of the chain is rendered impossible by the described construction of the chain, and since the outward flexure of said portions is rendered impossible by the stops or guides, the straight portions of the chain constitute racks which are to all intents and purposes rigid between the driving and driven wheels, and act exactly as racks having no flexibility, those portions of the chain which engage the gear wheels being free to readily conform to the peripheries of said wheels, as above described. I prefer to cut away the teeth $b^2$ on the chain links, to receive the plates $b^3$, so that the outer sides of said plates will be practically flush with the edges of the links $b'$, as shown in Figs. 2, 3 and 5.

I prefer to provide the teeth $a^2$ of the wheel $a$ with shoulders $a^5$ near the bases of said teeth, and to provide each of the plates $b^3$ with a recess $b^5$ (Fig. 4), said recesses being formed to bear upon the shoulders $a^5$, as shown in Fig. 1, thus limiting the depth of entrance of the teeth of the chain into the spaces between the teeth of the gear, and preventing the chain teeth from sticking or binding on the gear teeth.

$e$ represents a pocket or orifice, which is formed preferably in each tooth $b^2$, and near the base thereof, for the reception of a lubricating material, such as powdered plumbago. Said pockets extend through the ends of the teeth, and they are covered by the end portions of the plates $b^3$. The movement of the plates upon the ends of the teeth, caused by the flexure of the chain in passing around the gear wheels, causes a sufficient escape of the lubricating material from the pockets $e$ to lubricate the joint formed by the connection of the links to the plates $b^3$, thus obviating excessive wear and friction at said joints.

In the construction thus far described, the chain is shown as composed of a single row of links. In Figs. 7, 8, 9 and 10, I show the chain as composed of a series of rows of links, arranged side by side. The construction of each row of links is substantially the same as that above described, and the several rows of links are arranged to break joints, as clearly shown in Fig. 9. The pivots or pins that connect the links with the plates $b^3$ are in this case of sufficient length to extend across the chain, each connecting several links and plates, as shown in Fig. 8. By this construction of chain, employing a series of rows of links, the independent members of which are arranged to break joints, I enable the chain to be securely engaged with the wheel around which it passes, by the gripping or pinching action which the teeth of the links exert upon the teeth of the wheel at the point where the chain bends in passing around the wheel. By reference to Fig. 7, it will be seen that, when the chain is moving in the direction indicated by the arrow in said figure, the first link that is deflected from the straight course which the chain takes between the driving and the driven wheels, is caused to swing outwardly from the plane of the straight portion, as shown at $x$, so that the tooth at that end of the link co-operates with the adjacent tooth of the last link in the straight portion of the chain in gripping the gear tooth between said links. The chain is thus caused to grasp the wheel so firmly as to prevent displacement of the chain, the grasping action continuing until the last link in the straight series reaches the point where it in turn is thrown outwardly at its rear end. This grasping action of the teeth of the links on the teeth of the wheel, whether the chain is composed of one row or a series of rows of links, is due to the involute form of the teeth of said links. If the surfaces of these teeth were concentric with the pivots of the links, they could not approach each other in passing around the wheels so as to grasp the teeth of the latter. It will be seen that, by making the chain of a number of rows of links which break joints, the period during which the chain is thus engaged with the wheel is greater than when the chain has but one row of links, because, after one link has grasped and released the chain, the succeeding link in another row grasps the wheel and continues to hold the chain in engagement with the wheel, so that there is a practically continuous grasping of the wheel teeth by the chain teeth.

In Figs. 7 and 8, I show a modification of the guides or stops used to prevent outward flexure of the straight portions of the chain, said stops being shown as flanges $c^2$, formed on plates or bars $c^3$, said flanges being in position to support trucks or small wheels $c^4$, mounted loosely upon some of the connecting-plates $b^3$. The chain may be provided with any suitable number of wheels $c^4$ to secure the desired result. The plates $c^3$ may be provided at their opposite edges with inwardly-projecting flanges $c^5$, arranged to support another series of trucks or wheels $c^6$, mounted on some of the connecting-plates $b^3$.

The flanges $c^5$ and wheels $c^6$ are not essential, however, and their office is mainly to prevent strain upon the pivot pins of the upper straight portion of the chain, particularly when said chain is of considerable length. In this case, the wheels $c^6$, riding upon the upper flange $c^5$, cause said flange to support the weight of the upper straight portion of the chain, as will be readily seen.

The gear wheels used with the chain composed of a plurality of rows of links will have a corresponding plurality of rows of teeth $a$, as shown in Figs. 8 and 9.

The described improvement may be used in any mechanism in which power is transmitted from one wheel to another by flexible connections instead of by direct gearing.

The invention is particularly applicable to bicycles and tricycles, as a substitute for the ordinary sprocket-wheels and chains now used. I do not limit myself, however, to this use, and may use the invention for any apparatus to which it may be found capable of application.

The shoulders $a^5$ are preferably composed of pieces of hardened steel or other material, detachably secured to the teeth $a$ by screws $a^8$ (Fig. 6) or otherwise, so that said shoulders can be replaced by new ones when worn.

The meeting ends of the links $b'$ may be provided with buffer pieces $b^8$ $b^8$ (Fig. 3) of raw hide, or other material which will prevent noise when the links meet the outer edges of the plates $b^3$.

It will be seen that the guides $c\ c$, supporting the straight portions of the chain against outward flexure, prevent any tensile strain on the chain, the strain being entirely compressive, so that the pivots are not subjected to as great wear as in a chain under tensile strain.

Another advantage resulting from the absence of tensile strain is that the teeth of the chain and of the gear wear alike and remain constantly adjusted to each other, there being no increase of the width of the spaces between the teeth of the chain as there would be if there were a tensile strain tending to pull the links apart and thus wear the pivots.

It will also be seen that the recessed form of the ends of the chain teeth and the insertion of the connecting-plates $b^3$ into the recesses, enables the inner sides of the links to bear on the outer edges of the plates $b^3$, so that said plates co-operate with the abutting ends of the links in preventing inward flexure of the chain, the wear caused by the straightening out of the chain being thus distributed between the ends of the links, the inner sides of the links and the outer edges of the plates $b^3$.

The arrangement of the lubricating pockets $e$ is such that said pockets are covered by the plates $b^3$ in all positions which said links and plates can assume when the chain is running on the gear wheels. Hence there can be no loss of the lubricant nor any escape thereof excepting the desired gradual escape caused by the movement of the plates across the ends of the pockets, while the chain is in use. When it is desired to replenish the lubricant, the chain must be removed and bent abruptly to swing each pocket away from the plate which normally covers it. The straight portions of the chain being rigid, as already described, act precisely like inflexible racks, in moving on to and off from the gear wheels, each of said portions exerting a pushing force on the wheel toward which it is moving.

The trucks or wheels $c$ constitute anti-friction rolls, which run on fixed tracks, and thus prevent strain on the pivots of the links, by the weight of the chain, the outer tracks serving also to prevent outward flexure of the chain. The said anti-friction rolls may be arranged on any suitable part of the chain, so as to project from the side, back or front of the chain.

The advantages resulting from the construction of the chain, due to the reciprocal bearing of the ends of the links against each other, end to end, preventing longitudinal compression of the chain, and to the reciprocal bearing of the inner surfaces of the links against the outer edges of the link-connecting plates or sub-links, preventing inward flexure of the chain, are very marked, and we desire to emphasize the fact that the chain is composed of links pivotally connected and provided with two sets of reciprocal bearing-surfaces, one set represented by the abutting ends of the links $b'$ opposing compressive longitudinal pressure, so that the chain will not be shortened longitudinally by pressure exerted upon it, and such pressure will not exert injurious strain and wear upon the pivots that connect the links; while the other set, represented by the outer edges of the connecting-plates $b^3$ and the corresponding inner edges of the links $b'$ bearing upon said outer edges, prevent inward flexure of the chain.

In another application for Letters Patent of the United States filed by me May 19, 1893, Serial No. 474,743, I have described and claimed a gear chain composed of a plurality of rows of links, each link having gear teeth on the inner side, the links of each row breaking joints with those of the adjacent row and suitable connections between the rows of links.

I claim—

1. A gear-chain, composed of toothed links, pivotally connected, and provided with two sets of reciprocal bearing surfaces, one set being arranged to oppose compressive longitudinal pressure, while the other opposes inward flexure, as set forth.

2. A gear-chain, composed of a series of toothed links formed and arranged to abut against each other, and a series of sub-links pivotally connected with said abutting links, the said abutting links and sub-links having co-operating seats or bearings, the two series forming a chain which is self-supporting against inward flexure.

3. A gear-chain, composed of toothed links, and link-connecting plates pivotally connected to the links, the links being arranged to abut against each other, end to end, and against the outer edges of the plates, whereby inward flexure of the chain is prevented, as set forth.

4. A gear-chain, which is self-supporting against inward flexure, and is provided with integral involute gear-teeth at its inner side, as set forth.

5. A gear-chain, which is self-supporting against inward flexure and is provided with integral gear-teeth, combined with a stop or guide arranged to prevent outward flexure of a power-transmitting portion of the chain, as set forth.

6. A gear-chain, composed of links provided with teeth having pockets to contain a lubricant, and link-connecting plates pivotally connected to the links and arranged to cover the ends of said pockets, as set forth.

7. A gear-chain, composed of links provided with inwardly-projecting gear-teeth, and link-connecting plates pivotally connected to the links and provided with recesses adapted to receive shoulders on the teeth of a gear-wheel, as set forth.

8. A gear-chain, composed of a plurality of rows of links, each connected end to end by pivoted connecting-plates, said links having gear-teeth on their inner sides and being arranged so that the links of each row break joints with the links of the adjoining row, as set forth.

9. A gear-chain, having its links provided with involute gear teeth and provided with anti-friction rolls, combined with a fixed stop-guide formed as a track to support said anti-friction rolls, as set forth.

In testimony whereof I have signed my name to this specification, in the presence of two subscribing witnesses, this 3d day of June, A. D. 1892.

JAMES O. BROWN.

Witnesses:
C. F. BROWN,
A. D. HARRISON.